(12) United States Patent
Faszold et al.

(10) Patent No.: US 11,189,153 B1
(45) Date of Patent: Nov. 30, 2021

(54) MATERIAL CONTAINER MONITORING AND CONTROL SYSTEM

(71) Applicant: CapaciTrac LLC, Waterloo, IL (US)

(72) Inventors: Eric Allan Faszold, St. Louis, MO (US); Zachary Ray Hollis, Waterloo, IL (US)

(73) Assignee: CapaciTrac LLC, Waterloo, IL (US)

( * ) Notice: Subject to any disclaimer, the term of this patent is extended or adjusted under 35 U.S.C. 154(b) by 0 days.

(21) Appl. No.: 17/098,686

(22) Filed: Nov. 16, 2020

Related U.S. Application Data

(60) Provisional application No. 62/936,655, filed on Nov. 18, 2019.

(51) Int. Cl.
| | | |
|---|---|---|
| G08B 21/00 | (2006.01) | |
| G08B 21/18 | (2006.01) | |
| H04L 29/08 | (2006.01) | |

(52) U.S. Cl.
CPC ............ G08B 21/182 (2013.01); H04L 67/12 (2013.01)

(58) Field of Classification Search
CPC .............................. G08B 21/182; H04L 67/12
USPC ....................................................... 340/603
See application file for complete search history.

(56) References Cited

U.S. PATENT DOCUMENTS

| | | |
|---|---|---|
| 3,831,159 A | 8/1974 | Parsons |
| 5,282,389 A | 2/1994 | Faivre et al. |
| 5,957,773 A | 9/1999 | Olmsted et al. |
| 6,601,463 B2 | 8/2003 | Paslay |
| 6,986,294 B2 * | 1/2006 | Fromme ............... G01F 23/296 73/865.8 |

(Continued)

FOREIGN PATENT DOCUMENTS

| | | |
|---|---|---|
| CN | 204390383 U | 6/2015 |
| CN | 207515869 U | 6/2018 |

OTHER PUBLICATIONS

BinTrac Weighing System Online Brochure [online]. BinTrac, Sep. 3, 2020: Retrieved from the Internet: <URL: http://bintrac.com/>.

(Continued)

*Primary Examiner* — Zhen Y Wu
(74) *Attorney, Agent, or Firm* — Creativenture Law, LLC; Kevin C. Staed; Dennis J M Donahue, III

(57) ABSTRACT

A material container monitoring and management system comprising sensors operatively connected to a central local processor in wireless communication with a central server. The sensor set at least includes a material level sensor and a motor current sensor which respectively monitor a material level within the container and a motor current draw. Sensor data is relayed to the local processor to provide where it is initially analyzed and subsequently relayed to the central server for improved bin monitoring, alerting and control based on material level, current draw and detected environmental conditions. Given the environmental conditions available, the system operation parameters can be automatically or manually adjusted while dynamic performance benchmarks update relative to the measured variables and predicted dispensing patterns based on historical data. User monitoring comprises various selectable geographical views of containers and drill down view include specific information related to that container.

20 Claims, 5 Drawing Sheets

(56) References Cited

U.S. PATENT DOCUMENTS

| | | | | |
|---|---|---|---|---|
| 7,317,968 | B2* | 1/2008 | Lorton | A01K 29/00 340/10.41 |
| 7,317,969 | B2* | 1/2008 | Lorton | A01K 29/00 700/275 |
| 8,032,255 | B2 | 10/2011 | Phelan et al. | |
| 8,505,837 | B2 | 8/2013 | Warchola | |
| 8,581,734 | B2* | 11/2013 | Ozamiz | G01G 23/007 340/613 |
| 9,683,955 | B2* | 6/2017 | Bloemendaal | G01N 27/223 |
| 10,251,347 | B2* | 4/2019 | Xu | H04L 43/045 |
| 10,488,245 | B2* | 11/2019 | Gelada Camps | G01F 23/2928 |
| 10,782,069 | B2* | 9/2020 | Bloemendaal | F26B 21/12 |
| 2005/0080567 | A1* | 4/2005 | Wieting | F26B 25/22 702/2 |
| 2005/0284381 | A1* | 12/2005 | Bell | A01K 5/02 119/51.02 |
| 2013/0322995 | A1* | 12/2013 | Lopes | B65G 65/42 414/303 |
| 2014/0174368 | A1* | 6/2014 | Salinas | A01K 5/0291 119/51.11 |
| 2018/0128667 | A1 | 5/2018 | Loftin | |

OTHER PUBLICATIONS

Binsentry IoT Solution Online Brochure [online]. Binsentry, Sep. 3, 2020: <URL: https://www.binsentry.com>.

BinMaster Online Brochure [online]. BinMaster, Sep. 3, 2020:Retrieved from the Internet: <URL: https://www.binmaster.com/>.

English Translation of CN2204390383 [online]. Retrieved from the Internet: <URL: https://patents.google.com/patent/CN204390383U/en>.

English Translation of CN207515869 [online]. Retrieved from the Internet: <URL: https://patents.google.com/patent/CN207515869U/en>.

* cited by examiner

MATERIAL CONTAINER MONITORING AND CONTROL SYSTEM

CROSS-REFERENCE TO RELATED APPLICATIONS

This application claims priority from U.S. Provisional Patent Application No. 62/936,655 filed on Nov. 18, 2019 which is herein incorporated by reference in its entirety.

STATEMENT REGARDING FEDERALLY SPONSORED RESEARCH

Not Applicable.

APPENDIX

Not Applicable.

BACKGROUND OF THE INVENTION

Field of the Invention

The present invention relates to container monitoring and management systems, and more particularly to a system for monitoring and managing a solid within a material container.

Related Art

Bulk material containers have long been used in agricultural and industrial settings for storing various container materials including but not limited to grain, feed, food products, coal, cement, woodchips, pellets of various types, sawdust and various liquids. For example, material containers such as grain silos are used in conjunction with livestock feeders to efficiently store and disperse feed to livestock. In operation, the feeder systems include one or more silos which store feed before it is conveyed into one or more feeders using a motor driven auger or similar mechanical device. Accordingly, because the feed storage and dispersals are automatically controlled with material containers and connected feeders, there is a desire to those in the art to not only monitor material levels in the container in real time, but also alert users to set point levels, environment conditions that are out of normal operating ranges, real time dispersal metrics and predictive analysis features such as when the material will reach certain set points. Along with said real-time information and alert capabilities, there is also a desire for a system which stores and utilizes historical data to provide real-time predictive analysis to optimize ongoing operation. Finally, it is also desire to have a system with adjustable operational parameters that can vary from fill to fill depending on relevant environment conditions.

Given the commonality of material storage and feed systems, numerous monitoring and control systems have been developed to provide feed system owners with the most accurate and reliable data allowing them to reduce operational costs, reduce liability and increase productivity. In particular, it is a desire for those in the industry to reduce the necessity of manual inspections of material containers which is not only inherently dangerous but also reduces efficiency because material dispersal, such as livestock feeding or manufacturing processes, may need to be stopped or delayed for a person to enter the storage container to manually inspect it. It is also a desire to allow for remote container monitoring that allows fewer individuals to monitor more systems from remote locations. It is also a desire to accurately monitor and predict material levels in order to reduce the likelihood of containers unknowingly running empty and reducing overall system efficiency. Finally, it is a desire to provide operational awareness of the environment such that external factors that affect productivity are immediately reported so that high levels of efficiency are maintained.

Prior art systems which are currently used to monitor such systems include manual monitoring procedures where volume and environment conditions are monitored and controlled by hand, direct measurement systems which calculate the volume of material within a container by monitoring the overall weight of dispersed solids, and single-point and multi-point sensing systems that use one or more sensors within a container to monitor volume and other environment conditions. Although potentially effective, each of the current systems in the prior art include various downfalls and thus there is still a desire for an improved monitoring and control system.

Although less refined, some material container and feeder operators may revert to manual monitoring where a person necessarily enters or investigates a container to note material volume and take other pertinent readings. This poses an unnecessary risk and burden to manpower. Oftentimes a container will be elevated high above the ground to facilitate gravity feeding of the material out of the bottom of the container which necessitates a person climbing to the top and looking down into the depths of the container to view the fill level which is both physically taxing and unsafe. Alternative methods include striking the side of the container with a part of the body or blunt object to determine fill level which can be hard on the body, hard on equipment and inaccurate. Thus, there continues to remain a desire for a more robust monitoring system that is both cost effective and accurate.

Direct measurement of the overall weight of a known solid is presently the most effective process for monitoring bin volume. For example, the BinTrac® system monitors and displays bin volume based on feed use and feed delivery weight. However, this system and others like it rely on feed weight in order to calculate bin volume and therefore require additional machinery which must be incorporated with each bulk material container, adding cost and labor associated with implementing such a solution which outweighs the advantage gained by the accuracy of the volume measurement. Furthermore, such systems are limited in that they cannot monitor other environment conditions such as humidity and material type without the incorporation of additional sensors. Also, these systems may not be cloud connected causing manual inspection of the measurements.

Systems which do not weigh materials instead use various other sensors, such as light detection and ranging ("LIDAR"), radar, laser mechanical sensors, 3D scanners and sonar, to predict container volume of solids within a material container based on the distance the material may be from the top of the bin. For example, BinSentry™ systems and BinMaster® systems use point level detection to monitor bin volume. However, as with other single point monitoring systems, a problem exists because the surface shape of solids can change drastically from one location to another as the solid feed material is drawn from the container. Thus, there can be a wide disparity from a portion of the top of the grain to a portion of the bottom of the grain and there may be inconsistency from fill to empty cycles causing volume calculations to be ineffective and inaccurate.

Further still, additional problems arise in single point measuring systems which cannot accurately predict or account for "crowning" or "top crusting. Crowing or top crusting occurs when a layer of feed at the top of the feed pile within the container fuses in such a way as to allow the feed beneath the crusted layer to empty out while the feed at the top remains fixed in place. When top crusting occurs the entire bin may be empty except for a layer of feed that has become fused with no feed underneath despite the volume reading still showing sufficient feed in the bin. Such an occurrence leads to interrupted material dispersion causing reduced efficiency or yield and increased cost for the operation and there is therefore a need and desire for an improve monitoring and control system that can account for top crusting within a container and alert users to such an occurrence so that they can respond accordingly or program the system to automatically address the top crusting issue.

Other sensor-based systems combine various sensor types with one another and overcome the top crusting issue but still can be improved upon in order to provide a vastly improved monitoring system. In particular, there is a desire to those having an ordinary skill in the art to provide a system that not only effectively monitors bin volume but which is also capable of sensing other specific metrics, such as material type within the container, humidity, bound solids, motor data such as current draw, amperage level, RPM, and torque, dispersal flow rates and other pertinent data points. Further, it is a desire for the improved monitoring and control system to use measured data to predict future output, adjust system configurations to optimize output based on current and historical metrics and alert users to system issues, irregular events and general inefficiencies detected within the overall environment.

SUMMARY OF THE INVENTION

The invention is a material container monitoring and control system made up of a set of sensors operatively connected to a material container and conveyance motor. In particular, the monitoring and control system is intended for use with granulated solids that are dispersed from a storage container, such as livestock feed systems or manufacturing systems, where the granulated solids do not maintain a uniform surface shape within the container. In operation, the system provides real-time container monitoring of material volume and other environment conditions that can be remotely accessed on a user device via a web interface. Through the user device, the user can monitor material volume within a container in addition to other pertinent system conditions based on data received from the set of sensors that is subsequently analyzed in view of expected system conditions based on the particular container being monitored and historical data saved in a database. For example, pertinent system conditions that may be available to a user in a system report include but are not limited to conveyance motor metrics torque, RPMs, current draw, frequency and noise level, material flow rate from the container, actual and predicted material volume and run-out time, material density, material weight, ambient container atmosphere metrics like temperature, humidity and pressure, and the overall state of the material which may include but is not limited to fill level, mass, humidity, type, viscoelasticity and other similar material states.

The monitoring system provides situational awareness of the container, the motor and the bulk material in real-time by tracking system condition data with a set of local sensors that are in operative communication with a local processor. The system condition data received in the local processor is subsequently relayed to a central server where it is analyzed and stored in a central server database as a system report that can be accessed by a user through the user device. Furthermore, when system condition data is outside a variance threshold, the system can actively alert a user through the user device.

Although system condition data may vary depending on the type and number of sensors used, the monitoring and control system according to the invention described herein at least includes a level sensor within the container that monitors the material level and a motor sensor that monitors the electrical current draw of the motor according to the preferred embodiment but may also monitor other motor metrics including but not limited to torque, noise level, RPM which can be correlated with flow rate as further explained herein. With the material level within the container and the electrical current draw of the motor being continuously monitored, the system can estimate total material volume, material flow rate and run-out expectancy and subsequently alert users to the same.

The sensor, local processor and central server network allow authorized users to view material levels within the container, view predicted material levels over time based on historical trends corresponding to real-time data received in the central server and provide updates to operational parameters as needed. The cohesive operation of the level sensor and motor sensor also protects against common conditions such as top crusting that renders single point monitoring ineffective. These primary sensors and other secondary sensors which may be used in conjunction therewith also allow from the detection of other environment conditions, such as motor issues, and can automatically trigger mechanical control responses to remedy various issues and alerts. Further, the container monitoring utilizes ubiquitous technologies such as intelligent processor boards, sensors, cloud-based computing, remote control, user defined alerts and predictive analytics to create a comprehensive monitoring and control system bulk material storage and dispersal.

As detailed herein, there are many alert conditions and environment conditions which may trigger an alert event. Since these are all configurable parameters, the system is generally environmentally agnostic regarding motors or material containers that a site may have. Lastly, locally calculated measurements, runtime conditions and alerts are relayed to the central server which processes received data and displays it to the user via a web interface or alerts authorized users or groups of users of error conditions. Data received by the central server is subsequently stored in a database and used for later analysis by the system or accessed by the users.

In addition to accurately estimating material volume, flow rate and run-out expectancy, the system can also use the real-time system condition data collected by the sensors to optimize the operational parameters for the container and motor. For example, the central server may correlate one or more of the environment conditions received in real-time from the local processor with known sets of operational parameters saved in the database. Subsequently, operational parameters, such as the motor current, agitator function, or any other operational controls, can be adjusted to maximize efficiency given the existing conditions being measured by the sensors. As the configuration parameters are continuously refined based on real-time condition data, the system can also more accurately calculate material volume, flow rate and runout time. In addition, environment conditions are correlated with refined operational parameters and are saved in the database as a historic dataset and can be used for system optimization as well for more accurately projecting fill levels and container run outs for future cycles. Thus, not only are the configuration parameters continuously refined within each run-cycle but the database is continually updated and refined from cycle to cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
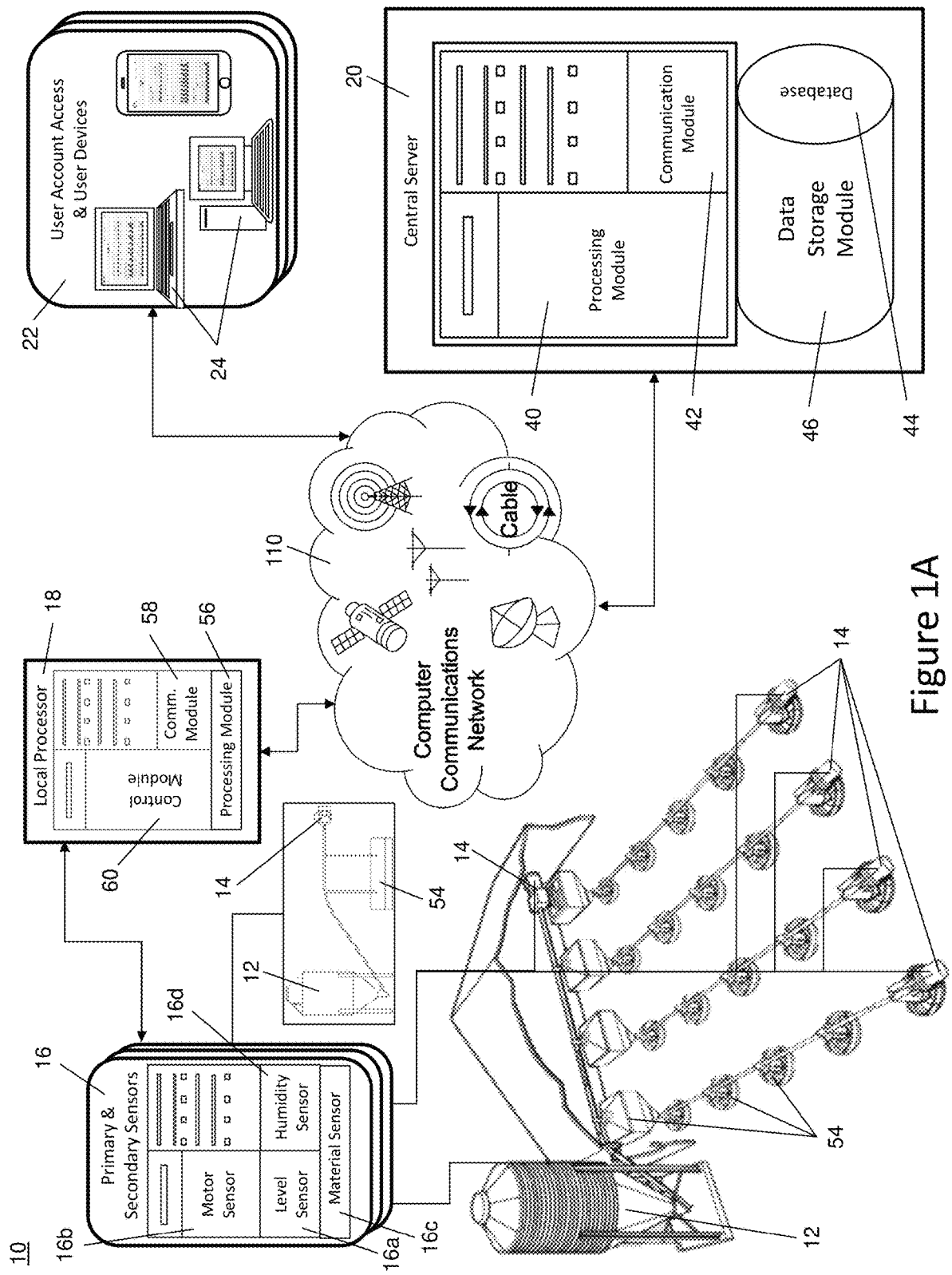
FIG. 1A illustrates a schematic diagram of the bulk material storage environment monitoring and control system according to the invention described herein.

The monitoring and control system 10 for a bulk material 100 according to the invention described herein includes a container, motor, sensors, local processer, central processor and user device in network communication 110 with one another. The preferred system is applicable to a livestock feeding environment that contains a grain or similar feed hopper container and one or more motorized augers that dispense the feed from the hopper container with one sensor being positioned within the container to monitor the material level therein and another sensor on the motor to measure electrical current draw consumed by the motor. As illustrated in FIG. 1A, the sensors communicate with a local processor proximal to the feeding environment and the local processor in turn has a communication module that is in wireless communication with a distally located central server. To access the environment condition data and receive alerts and periodic updates, authorized users are also connected to the central server through a user account accessed on a user device. Thus, users can monitor the environmental conditions in real-time as updates are sent from the local processor through the communications network to the central server or may be notified of alerts that can be automatically relayed from the central server to the user device.

The monitoring and management system according to the preferred embodiment described herein improves on existing systems with the use of at least one local processor and multiple sensors monitoring and collecting data on various environmental conditions during a run-cycle, such as the fill and dispersal of feed grain from the container. The environmental condition data collected by the sensors is subsequently processed in the local processor and central server and stored in a database to allow continual access to the state of environment through the user device as well as access to historical environment condition data and performance metrics. In particular, locally processed data is sent to the central server, further processed as needed and subsequently stored in the database. Subsequently, stored data can be compared against live runtime data to achieve high levels of prediction and optimized performance through adjusted operational parameters. Thus, not only is the environment continually monitored but is operationally optimized based on the environment condition data measured in real-time that is subsequently compared against historical data.

Figure 1B:
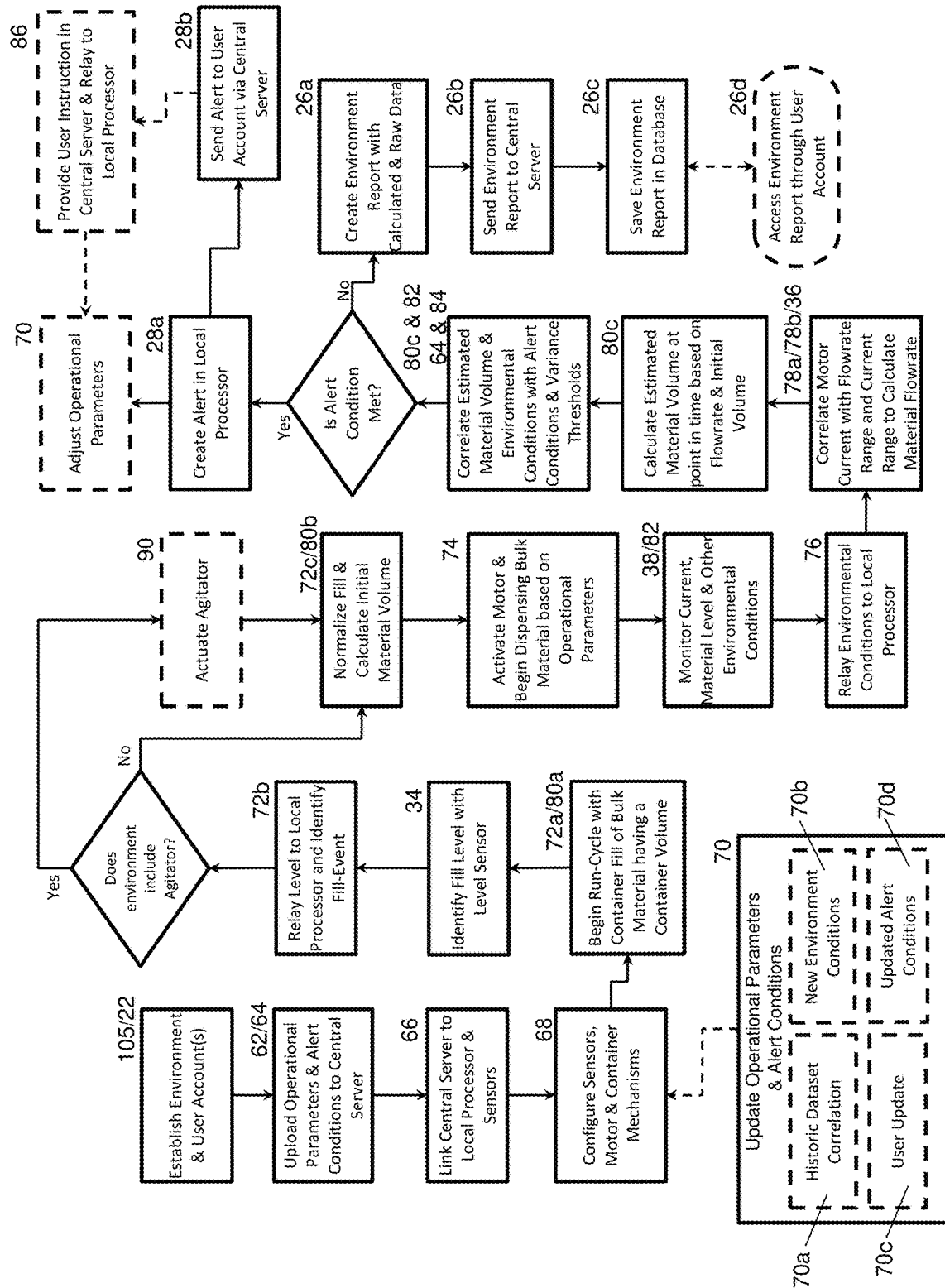
FIG. 1B shows a flowchart of the bulk material storage environment monitoring and control system according to the present invention

Although the system described herein includes numerous modes of operation and is not necessarily limited to a single methodology, the preferred mode of operation is outlined in the flowchart depicted in FIG. 1B. At the outset, the bulk material bulk material storage environment 105 with the motor and container are identified, users accounts are assigned, operational parameters 62 and alert conditions 64 are configured and linked to the sensors and the local processor 66. Subsequently, the sensors and mechanical systems of the environment can be configured 68 based on the corresponding operational parameters and alerts can be created based on the preset alert conditions and variance threshold. Based on the originally defined operational parameters, the run-cycle begins 72a with a fill event and the level sensor detects the material level that is relayed to the local processor 72b and normalized 72c to determine the initial material volume. In environment's having an agitator mechanism as described herein and shown in FIG. 2, the system may initially activate the agitator 90 prior to normalizing the fill to have a more accurate initial volume calculation. Subsequently, the environment runs 74 as normal with the sensors monitoring environmental conditions 82 and relaying the same to the local processor. Based on the current reading detected in the motor, a flow rate is determined and the material volume exiting the container and remaining therein is continually monitored. At the time intervals set by the user when the original operation parameters were entered, the local processer correlates the estimated material volume with the alert conditions along with the other calculated and raw environment condition data. If it is determined that an alert condition has been met, such as the volume has reached a certain threshold or an environmental condition is outside a variance threshold 84 from the established operating parameter, an alert is created and set to the user through the user account via the central server. Furthermore, the system may take corrective action by activating a mechanical response through adjustment of one or more of the operation parameters which in turn may adjust the motor, the container, the sensor or the variance threshold in response to the alert. Alternatively, the system creates an environmental report that is relayed to the central server and saved in the database which can subsequently be accessed by the user.

As the system generally operates according to the flowchart shown in FIG. 1B, it should also be appreciated that updates 70 to the operational parameters and alert conditions may be entered at any time either automatically by the system or manually by the user. As illustrated in the flowchart and further explained herein, the most common types of updates occur following the correlation of environmental conditions with the historic dataset 70a, a change in the environmental conditions 70b like a new material being detected, an update to the alert conditions 70d or a more general user update 70c, such as the correction of an erroneous entry when the environment was first established To initially establish the system, users typically define the operating parameters of the local environment corresponding to particular motor and containers and upload the operating parameters and alert conditions to the central server database and can subsequently make adjustments thereto through their user account. For instance, container size, electrical characteristics of conveyors, grain types, container geography such as name and location, and alerting characteristics such as alerting types, users, areas and containers are determined by the user and configured in the database of the central server. The local processor with specific identification characteristics pulls this information from the central server and monitors the local environment based on the operational parameters. However, the local processor also uses specific identification characteristics to notify the central server of new environmental conditions and subsequently retrieves updated operation parameters based on the new environmental conditions while the central server stores resultant data associated with that local environment in the database.

Further, if the user determines that the database needs to be updated they can enter an update through the user account. In operation, the central server receives the update from the user and correlates it with the data saved in the data module of the database and updates one or more of the operational parameters and alert conditions, such as the container volume, the electrical current range of the motor and or the flow rate range corresponding to the motor. Similarly, a database can also update user permissions and any other data stored therein so that the system is completely customizable by the user.

Although the system itself is automated and continuously monitors environment condition data to make various operational adjustments based on real-time data and historic trends without required user interaction, it is also a primary function of this improved system to facilitate user access and control through a user account. Accordingly, the system includes a user account 22 permitting operative communication with the central server through a user device 24 and thereby allows the user to be in operative communication with the on-site processor, sensors, motor and container. Furthermore, the user device permits user access through the user account via a web connection so users may access their account from any number of devices, such as a smartphone, tablet, desktop or laptop computer.

The user account is accessed on the user device with a portal that applies standard logon and password settings with established access functions along with application-based role and sub-role functions. For instance, back office users may wish to know one group of system alerts as discussed below, such as when container capacity is below a certain threshold, while field support will want to receive other types of environmental alerts, such as network loss or motor issues. Accordingly, user account access can be customized based on user role. Further, user alert methods can also be customized wherein one user may customize their account to send an SMS message to their preferred user device whereas another user may customize their account to send an email to their preferred email address. Furthermore, a system operator or contracting organization may create an on-site cloud environment to have total control over users within a local environment but most operations will prefer to utilize cloud offerings from AWS, Azure, Google or IBM to forego the expertise needed to maintain a compute environment.

Figure 2:
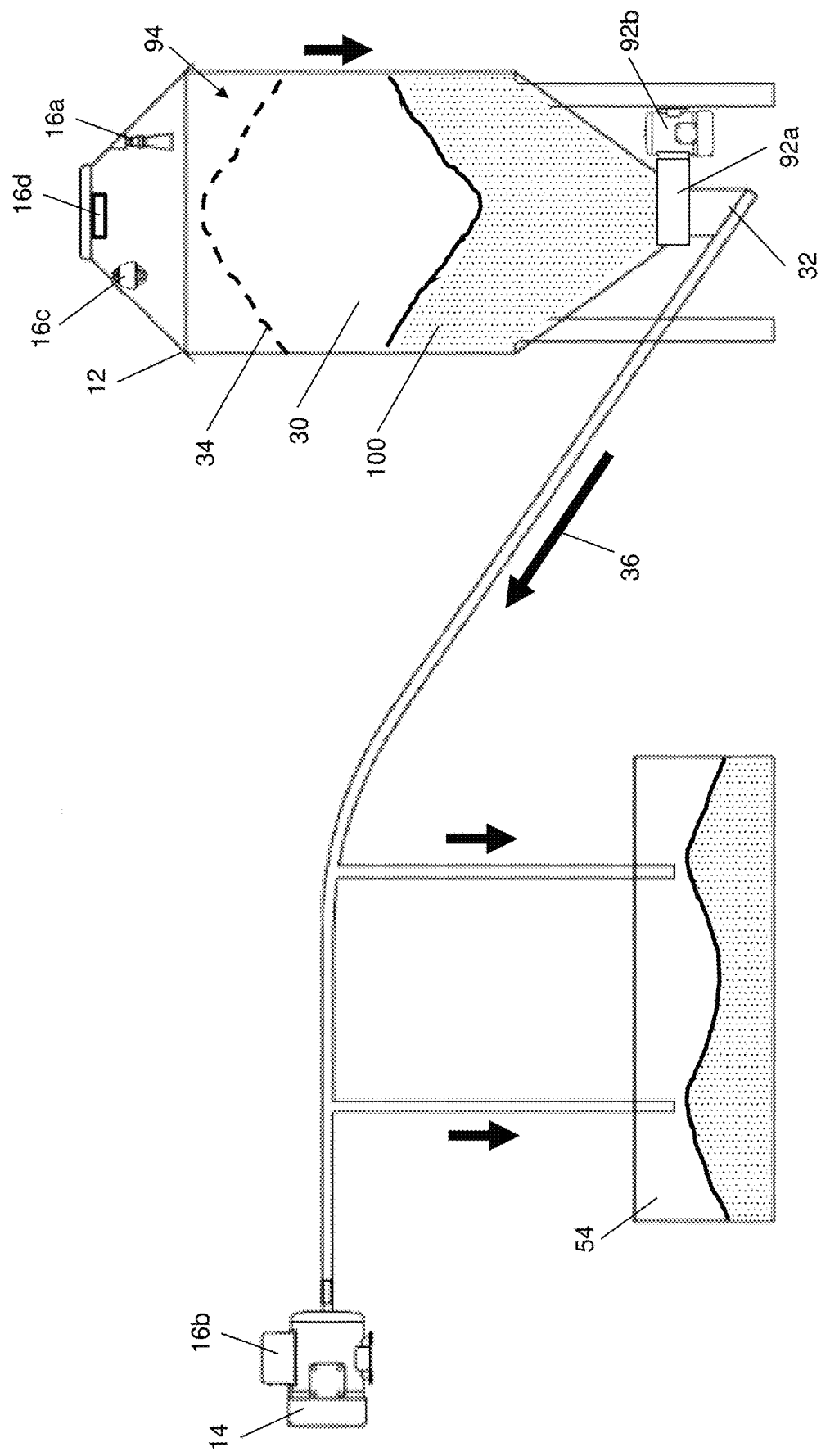
FIG. 2 shows an example local environment according to the invention described herein.
Figures 3A, 3B, 3C, 3D:
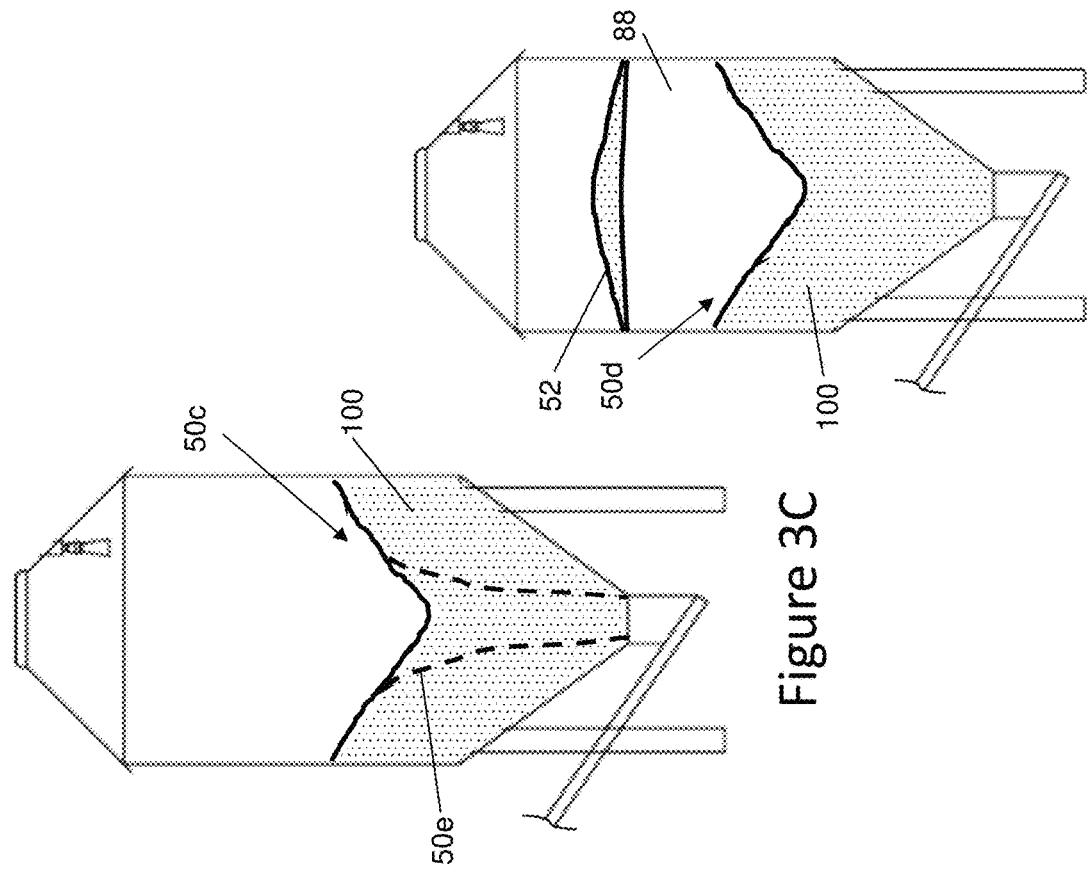
FIGS. 3A-3D illustrate various container states according to the invention described herein.

The on-site container 12 includes an interior space 30 in which the bulk material 100 is held and an outlet 32 for dispersing the material from the container, such as shown in FIG. 2. Furthermore, the interior of the container includes an ambient atmosphere 94 that can be monitored as described herein. Accordingly, the container bulk material is filled to a level 34 in the container at the beginning of a run-cycle as shown in FIG. 3A and subsequently dispersed therefrom according to standardized or user entered operational parameters that are particularly suited for the environment in which the system is operating. FIGS. 3B, 3C and 3D illustrate a dispersal of material and show the container at various states. For example, a run-cycle may last for a period of hours or period of days depending on the fill level within the container, conveyance motor settings that facilitate dispersal of the material from the container and environmental conditions unique to the environment in which the system is operating.

To facilitate dispersal of the material from the container, a conveyance motor 14 is provided which engages the outlet of the container and operates according to operation metrics. According to the preferred embodiment, it will be understood that the motor drives an auger which moves feed grain from the outlet of the feed bin at a flow rate 36 to one or more downstream feeders 54, as depicted in FIG. 1A. However, other container and motor environments which may incorporate the monitoring and control system described herein may include alternative mechanical devices that facilitate dispersal of a bulk material from the container. Regardless of the environment in which the system is applied, the conveyance motor produces an electrical current 38 during operation which is subsequently detected by the motor sensor and correlated with other measured and historic system data to more accurately calculate material volume within the container as well as predict material flow rate, blockages, container runout and similar motor or system issues.

The primary local sensors that are included in all variations of the monitoring and management system described herein are a level sensor 16a positioned within the feed container and a motor sensor 16b situated on the corresponding motor. These primary sensors are subsequently combined with one or more secondary sensors which may include a material identification sensor 16c, humidity sensors 16d or other similar sensors, such as temperature sensors, which read and relay other pertinent environmental conditions like ambient container atmosphere, motor operation metrics and material states to the cloud server to be correlated with the primary sensor data and accessed by the user. Although material identification sensors and humidity sensors are used in combination with the primary sensors in the preferred embodiment, it will be appreciated by those having an ordinary skill in the art that the number and type of secondary sensors may vary and the most basic system according to the invention described herein need only the level sensor and the motor sensor.

To initially identify and continuously monitor the level of the bulk material within the container, a material level sensor is provided that measures the level of the material within the container with respect to a reference point within the structure itself. As depicted in FIG. 2, this sensor is imbedded in the materials container, preferably opposite from the bottom outlet near the top and thereby measures the topmost portion of the material after a fill event and subsequently provides level readings for the material in the container throughout the run-cycle. Although material level is continuously monitored by the level sensor, as referenced above and further explained herein a problem arises when solids within the container are top crusted 52 and an empty space 88 is created between the top crusted material and the bulk of the material remaining in the container, as illustrated in FIG. 3D, and it is therefore assumed that the level sensor alone is unable to accurately measure material levels since material may not settle uniformly within the material container. Thus, the level sensor is primarily used for detecting initial fill conditions and determining an initial fill level at the beginning of a run-cycle which is the only time the granulated solids can be normalized. This normalization of the material level when a fill event is detected allows for the adjustment of other operational parameters based on the initial fill level and thereby allows for the container to be filled to differing levels from cycle to cycle wherein the operational parameters, such as flow rate that is correlated to motor current draw, are automatically adjusted to an optimized level based on the normalized material level at the beginning of the run-cycle.

The preferred level sensor is an ultrasonic SONAR distance sensor that measures the height of the material within the container with respect to a reference point within the structure itself. Although sensor positioning may vary relative to the shape of the container, it will be understood by persons having a skill in the art that typical grain bins according to the preferred embodiment are round or conical in shape and are filled through a central top opening 48a. Accordingly, the sensor in the preferred embodiment is placed proximate to the top of the structure in such a way that it reads the distance (X) between the bulk material level and the structure at a point 48c that is midway between the centralized fill location and the outermost edge of the container 48b. Thus, due to the natural angle of repose that the bulk material may assume 50, the level reading mimics the average height across the entire top surface of the material after the initial fill event.

As noted above, FIG. 3A shows the container after a fill event where the material level can be accurately detected to calculate the initial material volume wherein the material level 50a is uniform. Subsequently, FIGS. 3B, 3C and 3D illustrate the container and bulk material at alternative states with some of the material having been dispensed therefrom to further illustrate scenarios where the level reading can be inaccurate. For example, FIG. 3B shows a container with the material being significantly lower on one side wherein the top level 50b of the material is no longer uniform and therefore cannot be used to accurately measure material volume. FIG. 3C illustrates a more standard and regular material shape within the container with a uniform material level 50c but also illustrates a "rat-hole" effect 50e that can occur where material is bound on the sides of the container and a hole extends from the top level all the way to the container outlet. Furthermore, FIG. 3D illustrates a top crusting event where a layer of material is bound and an empty space is provided between the top crusted portion and the top level of the remaining material 50d. As discussed herein, single-point sensors are thereby ineffective at detecting these various container states and the system described herein thereby improves on systems in the prior art.

Figure 4:
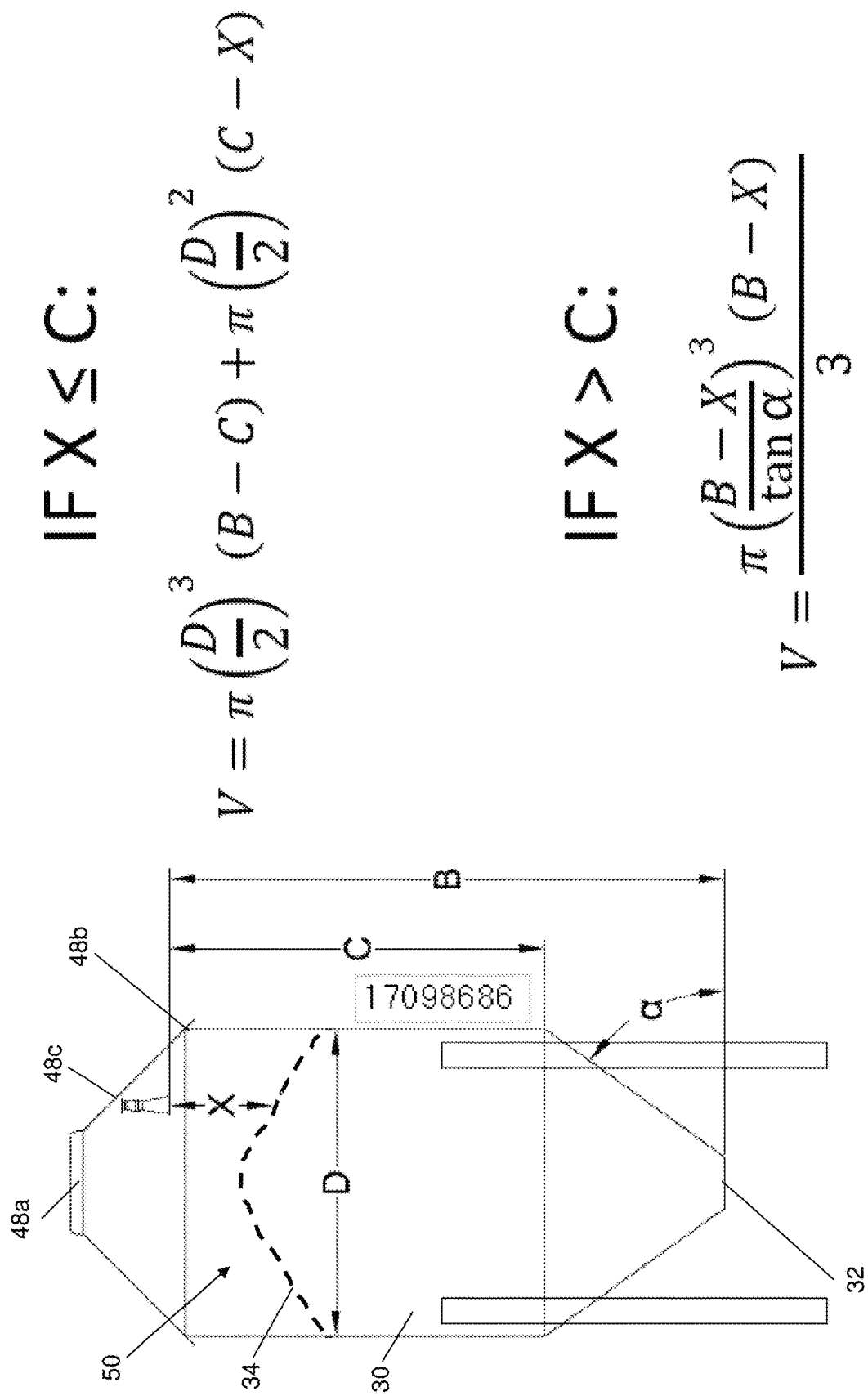
FIG. 4 illustrates example volume equations and associated variable definitions used to predict initial material level according to the invention described herein.

Once a fill is detected by the level sensor, the system may actuate an agitator 92a within the container controlled by an agitator motor 92b motor for a period of time to spread the bulk material within the container that is also in operative communication with the local processor. Subsequently, the material level can be accurately detected by the level sensor and relayed to the local processor for normalization with the local processor comparing changes in material level over defined times set by the user or based on historical data saved in the database to determine that a fill event has occurred. Subsequently, the local processor can determine an initial fill level for a run-cycle and subsequently calculate an initial material volume within the container based on detected material level and maximum container volume based on the dimensions of the container itself, such as according to the variables (X, D, C, B, a) and corresponding volume equations illustrated in FIG. 4. Once the initial material volume is determined, other data such as material volume at various runtime intervals and container runout can be adjusted based on the initial percent full condition.

To monitor the electrical current draw of the motor, a motor sensor is connected thereto or integrated therewith. In operation, the motor sensor measures the electrical current drawn by the conveyance motor as material is dispensed from the container and relays the current draw to the local processor as further described below. Subsequently, the condition data relayed from the motor sensor is integrated with a material flow rate over a period of time and the level sensor condition data to calculate an estimated material volume within the container at various time intervals. Although current sensors are used in prior art systems, the monitoring and control system described herein improves on existing systems because it not only uses current readings to more accurately calculate material volume based on flow rate but also details when material is not flowing, when material has been flowing for too long, when material has not flowed long enough and when motor or other system issues arise given the continuous correlation of real-time current condition data with historic datasets saved in the central server. Thus, the monitoring and control system includes two primary local sensors that respectively relay system condition data, namely a material level and current draw, to the local processor.

Further, the current sensor may also measure other various issues related to problems that the conveyance motor might be having, such as the motor not running within a specified period of time, running too long, running with no grain present or drawing too much amperage in addition to other relevant motor measurements. However, the main characteristics are parasitic draws, low current draws, high power draws, material conveyance draws and various runtime conditions and triggering time spans as defined in the listing below:

Parasitic Draw: operational parameter notifying the local processor that a current reading of a particular value can be ignored if it falls below the parasitic draw value. For instance, if the current sensor detects an amperage of 0.068 amps and the parasitic draw value is 0.093 amps, the local processor will assume that the 0.068 amps reading is actually zero and determine that the motor is off Low Current Draws: if the current reading is above the parasitic draw value but below the Low Current Draw value, the local processor assumes that there is no material flowing. Thus, the local processor identifies that the motor is running but no material is flowing through it which can be noted as an alert condition in that the material is top crusting with no material being dispensed from the container Material Conveyance Current Draw: once the current readings exceed the Low Current Draw value, the local processor assumes that the motor is running and counts a cycle for every second that the motor runs with various amperage values being established within the central server to determine the types and amounts of material being moved Cycle Counts: operational parameter indicating that the motor has run above the Low Current Draw value for 1 second. This parameter is the total number of cycle counts that the motor needs to run from the time the container is full or partially full from a fill event until the container is empty. This value indirectly determines the volume remaining in the container and can be verified against the estimated volume determined by the flow rate and detected volume determined by the level sensor. Depending on operational parameters, the count for any 1 second increment can be fractionalized by the actual current reading from the motor. For instance, 3.0 amps indicates that material is moving and 3.5 amps indicates that a full load of material is moving. Thus, 3.25 amps can indicate that only half of the amount of total material is actually being moved. Thus, the count parameter can be adjusted from 1 to 0.5 counts.

Secondary sensors which are used in the preferred embodiment include a material sensor that identifies the specific type of granulated solid that is being stored within the container and moved by the conveyance motor. When used, this material sensor allows for the adjustment of the electrical current parameters that feed into the calculated flow rate where the density of the identified solid is known. Along with the level and current sensor data that is relayed to the central server, the identified material is similarly relayed to the central server. Subsequently, the central server provides an updated operational parameter based on identified material in the container. Thus, when the material sensor identifies that the granulated solid has changed, the local processor will pull a corresponding operational parameter from central server in order to optimize system efficiency based on the newly identified material.

Another secondary sensor that is used in the preferred system embodiment is a humidity sensor. When known, humidity level allows for the adjustment of the calculated flow rate due to differences in the material density that may vary with humidity. Furthermore, as the humidity sensor allows the system to determine the density of the bulk material, the system can also determine the mass of the bulk material within the container by correlating the density with the estimated volume. Thus, although the minimum sensors that are necessary for the system to operate as described herein are the level sensor and current sensor, the preferred system also include a density sensor where material mass is a preferred metric to those having an ordinary skill in the art. Further, the inclusion of a humidity sensor greatly improves the described system over other system in the prior art where it accurately calculates mass through the connection of a single sensor rather requiring the addition of expensive weighing machinery typically used to determine material mass which must be incorporated with each bulk material container. Alternatively, it will be understood that systems that do not include a humidity sensor can still calculate mass based on density wherein an user can include density measurements when the environment is established and operational parameters are set.

As with the other sensor data described above, the humidity within the material or container itself is determined by one or more humidity sensors situated therein and is relayed to the central server in the environmental update created by the local processor. Subsequently, the humidity sensor data is processed along with the other data from the other sensors and a more accurate operational parameter is sent to the local processor. For example, when humidity is considered, the motor flow rate is adjusted based on the electrical current reading providing a more accurate flow rate and subsequent volume calculation.

As real-time environmental condition data corresponding to the container, motor and bulk material is continuously monitored by the sensor set, the condition data from the primary and secondary sensors is subsequently relayed to a local processor 18 located proximally thereto. As illustrated in FIG. 1A, the local processor includes a local processing module 56, a communications module 58, and a control module 60. As the local processor not only receives and analyzes condition data received from the sensors but can also control mechanical systems within the container, the motor and the sensors themselves, the communications module of the local processor is in operative communication with each system element through a wired or wireless connection, such as a Bluetooth® connection. Furthermore, the communications module of the local processor is also in wireless connection with the central server, such through a a cell, 3G, 4G, LTE, WiFi or other wireless communications network.

Although processing is generally completed on the central server as explained below, predictive analytics, such as the level of materials within the container, are shared functions between the central server and local processor. Further the local processor may hold six hours or more of relevant sensor data in processor memory for very fast analysis of changes over time. As referenced herein, the local processor is in operative communication with the central server through corresponding communication modules and in operation provides several functions which include but are not limited to collecting data from local sensors; and relaying data to the central sever which subsequently relays data to authorized users on their communication devices which include but are not limited to computers, phones, apps or websites used by operational and management personnel; actively monitoring all local sensors and alerts users of issues through central server.

Although local sensors continually monitor environmental conditions and relay the same to the local processor where they are initially analyzed, the local processor transmits the raw and analyzed data to the central server 20 at regular intervals defined by the user or continuously as data is received and analyzed within the local processor. As illustrated in FIG. 1A, the central server includes a server processing module 40, a server communications module 42, and a database 44 in a data storage module 46. In the preferred system the central server is cloud based but persons having an ordinary skill in the art will appreciate that a local server may be incorporated into an alternative system while still incorporating the innovative aspects of the system described herein. Accordingly, it should be understood that the cloud based central server is not intended to be limiting.

Thus, the local processor and central server communicate with one another with environment reports and alerts being passed from the local processor to the central server 76 and system updates, instructions and operational parameters being passed from the central server to the local processor. Subsequently, the reports and alerts created within the local processor can be refined and operational parameters can be adjusted. However, those having an ordinary skill in the art will further appreciate that the inventive system described herein can operate according to a preferred embodiment where only one of the local processor and central server are provided and are in network connection with the sensors and users through the user account.

In addition to tracking raw environment condition data returned from the sensors, the system described herein correlates the raw environment condition data provided by the sensors with baseline container and motor metrics saved within the database of the central server. In particular, volume metrics corresponding to the interior space of the containers and electrical current ranges corresponding to particular motors that facilitate material dispensing from corresponding containers are stored in the database and retrieved by the local processor to analyze sensor data relative to the baseline dataset. Further, the database also stores a range of material flow rates 78*a* that correspond with the electrical current range 78*b* to allow the system to calculate the material flow rate from the container based on the electrical current draw of the motor integrated over a period of time.

When the system described herein is first implemented, a user may enter relevant baseline environment data, such as container and motor metrics that include but are not limited to container dimensions, motor capacity and corresponding flow rates. Similarly, as the system is intended to operate within a network of similar environments, such as with multiple grain bins and feeders in an agricultural setting as depicted in FIG. 1A, a user may enter an array of container and motor metrics that respectively correspond to various local environments. Once one or more local environments are established and minimum baseline environmental data is uploaded to the database, the central server can push baseline data to the local processor operatively engaging a series of container and motors corresponding to a particular environment and the sensors can monitor the local environment in view of the baseline data.

Although various environmental conditions allow users to monitor various parts of the overall environment, a primary aspect of the inventive system described herein is the central processer identifying the actual volume of the interior of the container 80*a* to allow the local processor to normalize a detected material level within the container as an initial bulk material volume 80*b* at the beginning of a run-cycle. Subsequently, the electrical current draw of the motor is integrated with the flow rate range received from the central processor over a period of time to identify the material flow rate from the container. With the initial bulk material volume identified after a fill and the material flow rate being constantly estimated based on the current draw, the system can calculate an estimated bulk material volume 80*c* at any time interval during a run-cycle. Thus, users are able to track material volume during a run-cycle through environment reports that are available in the central server as discussed herein and are also notified of pertinent alert conditions when one or more alert conditions are met, such as when the estimated bulk material volume hits a certain threshold during a run-cycle or when system issues are identified in addition to the various other alert conditions discussed herein.

As bulk material volume is continuously calculated based on the flow rate of the material from the container relative to the initial container volume and continuously measured by the level sensor, the system returns redundant volume measurements to not only more accurately monitor material volume but also protect against erroneous readings that may be caused from top crusting. Accordingly, the local processor verifies the estimated bulk material volume calculated relative to the electrical current draw against detected volume that is returned by the level sensor. Thus, when the estimated bulk material volume and the detected bulk material volume are outside a preset variance threshold, the system can identify that a top crusting event is occurring and take corrective action by actuating an agitator motor as described below in addition to notify the user that an alert condition is occurring.

Additional volume verification is provided where the system itself can predict bulk material volume across a range of time intervals based on container and motor metrics saved within the database. In operation, verification occurs as the server processing module correlates the container volume with the flow rate range corresponding to the electrical current range and produces an expected bulk material volume within the container across a range of time intervals. Subsequently, the expected bulk material volume can be relayed to the local processor and correlated with the estimated bulk material volume at the same time interval. In the event that the when the estimated bulk material volume and the expected bulk material volume are outside a variance threshold, the system can again identify that an issue has occurred, take corrective action and notify the user that an alert condition is occurring.

Furthermore, a particular example using the motor metrics described above also allows the system to determine bulk material volume relative to container volume based Cycle Count. For example, if the total number of seconds it will take to empty a full container two hundred (200) seconds, then as the processor counts the number of seconds that the motor has run, the percent full of the material container is adjusted downward. In this case, assuming a starting point of one hundred percent (100%) full and a Cycle Count of two hundred (200) cycles to empty the container, if the current sensor has indicated that the motor has run for fifty-eight (58) seconds, the percent full reported will be seventy-one percent (71%). Thus, a critical measurement is when the level sensor detects a fill event. The level sensor will detect the event and also determine the Percent Full based on level sensor readings after the fill compared against the operational parameters for the identified environment. Once the percent full is calculated, the cycle count is adjusted to reflect the starting point of the percent full. For instance, if the level sensor detects a fill event and the local processor calculates a percent full of eighty-one percent (81%), the cycle count is also adjusted wherein 162 cycle counts will be required to empty the bin. If the motor has been detected to run for fifty-eight (58) seconds already, the percent reported will be fifty-two percent (52%) and the remaining cycle counts will be one hundred and four (104) until the container is empty. The amperage values can be finely adjusted to inspect values that indicate a valid but partial load draw and the cycle count can be adjusted to partial cycle counts.

While the alerts described herein are created within the local processor or central server and relayed to the user as soon as an alert condition is met, environmental reports 26 are created 26*a* and uploaded to the central server from the local processer 26*b* and saved in the central server database 26*c* either continuously or at defined intervals set by the user or host organization. For example, the organization or user can establish and subsequently modify update intervals from continual updates to minutes to hours to days or any other time interval they see fit. Environment reports are created within the local processor at the established time intervals and include both the raw condition data measured by the sensors, such as level reading and electrical current draw, and the analyzed data, such as the initial bulk material level, flow rate and estimated bulk material level that the local processor produces as detailed above. Further, the environment report also includes predictive metrics like container runout which can be calculated in the local processor by correlating the estimated bulk material volume with expected material flow rate. Subsequently, the report is relayed to the central server where it is stored in the database for the corresponding local environment and accessible by the user 26d.

In addition to providing real-time access to environmental conditions throughout a run-cycle, the system described herein also includes alert functionally to notify users when alert conditions are met. For example, as the local sensors return environment data information to the local processor and both raw and analyzed system data is relayed to the central server, the system can create an alert 28a and notify users with the alert 28b based on preset alert conditions that are customizable on an organizational and user level, such as container volume warnings, run time errors, and motors that are operating outside of defined boundaries. In operation, these alert conditions are initially establish by the user or contracting organization when the operational environment is setup but may subsequently be adjusted by the user or a contracting organization that manages the system implantation in the local environment as needed. Subsequently, as one or more alert conditions are met based raw and analyzed environment condition data outside a variance threshold corresponding to the operational parameters, alerts are created by the processing module of the local processor or the central server and relayed to the user account. Accordingly, the plurality of alert conditions setup for a particular environment are also saved in the central server database and correlated with the particular local environment.

In operation, the local sensors monitor the environment conditions corresponding to the material container, the motor and the bulk material based, such as bulk material level and motor current, relative to the baseline data that is stored in the central server database detailed above. Subsequently, alerts are created in the local processor and relayed to the user when system conditions are outside an acceptable variance threshold corresponding to the established operational parameters or when a user establish condition is met. For example, a user may establish alert conditions that coincide with the estimated material volume within a container such that alerts are sent to the user when the bulk material reaches fifty percent (50%) of the original volume, twenty-five (25%) of the original volume, five percent (5%) of the original volume and when the estimated bulk material is at zero. Further still, other alerts may be directed towards more predictive analysis, such as when the estimated bulk material is correlated with the material flow rate and a container runout time is calculated. Accordingly, the container runout time and a corresponding countdown, which may be a number of hours or days, can be sent to the user in an alert.

In another aspect of the monitoring system, a user can modify the alert conditions for the particular environment being monitored and controlled. For example, a user can customize the system to notify them when a container level reaches thirty percent (30%) instead of twenty (20%) which may equate to a critical low reading. Similarly, if a motor was replaced, the inductance period or inductance reading or baseline reading for material moving can be changed through a user update, for example from 3.5 amps to 2.75 amps with an inductance period changed from five (5) seconds to two (2) seconds.

Along with creating and relaying alerts directed to the standard operation of the local environment like estimated material volume and runout, the system is also capable of creating and alerting users to error conditions that may arise within the system when the sensors return environmental condition data that is outside a variance threshold from the established operational parameters. More particularly, alerts are created within the local processor or central server as real-time environment condition data is received from the sensors and is correlated with baseline operational parameters saved within the database. For example, as explained above the database stores motor metrics directed to the function of the motor, such as current capacity and optimized operational parameters. Given these baseline metrics, the local processor can correlate the motor current draw reading over a period of time with the motor current capacity, optimized operational parameters or similar motor metrics and subsequently alert users when a motor issue arises. Thus, an alert may be created when the electrical current reading exceeds the expected capacity for an extended period of time or a similar alert may be created when the motor current is outside the optimized operational parameters according to the established baseline. Thus, sensing pertinent environmental conditions early and alerting users of the same allow users to mitigate issues quickly and optimize efficiency of the overall bulk material storage environment.

Although the number and type of alerts that may be used depend on the local environment and number of sensors within a system, alert conditions generally include but are not limited to detection of a fill event beginning a new run-cycle and initial detected bulk material volume, bulk material volume percentage is within acceptable range, bulk material volume percentage warning as it approaches an unacceptable range, low bulk material volume percentage level, invalid sensor reading, electrical issue, external sensor or mechanical issue, motor inactivity, motor running too long based on preset operational parameters which would indicate that an external switch did not go to the off position and can indicate a spillage issue, motor running while no grain is present which indicates that the container is empty or the outlet is blocked, motor is drawing too much amperage which indicates a problem with the motor or a problem in the mechanical system, a material level is higher or lower than preset container maximum or minimum which suggests that the baseline data was entered incorrectly or the container is over-filled or under-filled, system run time errors which indicates that the local field unit has experienced an operational error, an alert that container agitator discussed below was activated or deactivated, a network loss where sensors or local processor have lost connection with the central server, and an unstable network where the connectivity cycles or is intermittent.

Furthermore, administrative users can modify authorized user configurations for various users within an organization, such as by adding or subtracting users from alerts, customizing particular alerts for corresponding users, defining authorization levels of various users, establishing contact data for alerts unique to the user, providing general system access, and assigning specific user roles to be carried out by the user, such as remotely changing all operations parameters of the local processors. For example, in an organization with multiple local environments being monitored and controlled, an employee who works at location-A may receive all alerts from location-A. Subsequently, if the organization moves the employee to location-B, the employee's alerting configuration can be changed by modifying the permissions attributable to the employee's user account to that they receive alerts corresponding to location-B rather than location-A. Similarly, organizations can classify alerts by user type with one class of alerts, such as container volume specific alerts, going to one class of user while another class of alerts for the same local environment, such as mechanical specific alerts, go to another class of user. For example, an organization may enable user accounts for back-office staff that fulfill orders to receive alerts when a container is empty or is filled and but who may not by interested in alerts describing an electrical condition. Thus, alerts can be targeted and easily be updated in real-time on both a user and organizational level.

In another aspect of the inventive system described herein, the system combines monitoring and alerting functionality with both automated and manual mechanical control of the environment to optimize system and environment efficiency as well as refining operational parameters used in determining that an alert condition has been met. Operational parameters are saved in the central server database which correspond to operational settings for the motor, sensors, mechanical devices within the container and local processor. As with the container and motor metrics that are uploaded by the user, baseline operational parameters are also uploaded to the central server database for the corresponding environment that is to be monitored and controlled and also establish alert thresholds for corresponding alert conditions. Given these operational parameters, the system can adjust performance controls, sensors and variance threshold for determining alert conditions from environment to environment.

Although the system may continue to operate within the initially set operation parameters defined by the user and provide situational awareness and alerts for the particular material system environment being measured, it is another aspect of the monitoring system to automatically retrieve and refine operation parameters based on real-time measurements from the local sensors that are processed in both the local processor and central server. For example, when the local processor detects a changed condition, such as a new material being moved through the container or feeder, the local processor sends the updated material type data to the central server cloud and subsequently receives an updated set of operational parameters corresponding to the new material that is detected. Thus, the updated operational parameters allow for updated sensor input analysis and operational boundaries that trigger alerts tailored to the newly detected data. Similarly, these operational parameters can be updated by the user at any time by entering a database update through the users account.

In another example, since the density of the solid in the container can cause changes in the electrical characteristics of the motor, an updated operation parameter may be required when the material type in the container changes. Thus, when the material within the container changes, the local processor pulls an updated operation parameter from the cloud server. Similarly, system operating parameters are determined and alerts are defined when operating conditions meet, are within and are outside of the identified parameters.

For example, these operational parameters may include but are not limited to the MAC ID for the physical processer board identified in the central server and linked to the local processor, current overrun count which defines how many seconds the motor can be "on" before triggering an alert message, low current reading span which defines the minimum number of historical seconds a low current needs to be detected to identify a low current reading, no current span which defines the minimum number of historical seconds no current needs to be detected to identify a no current reading, motor off leakage threshold which allows the system to factor out de minimis electrical current readings and parasitic draw below the defined value and identify the system as being off, check in time which defines the number of seconds before the local processor board will do a general check in to the central server, bad sensor reading count which defines the number of allowed bad sensor readings over a time span before an alert is sent, bad sensor reading span which defines the historical number of seconds to detect a bad sensor reading, minimum low depth that materials can be detected within the container, maximum low depth that materials can be detected within the container, alarm suppression time where once an alert is triggered, the alert is then suppressed for the defined value, debug mode which allows all data to be sent to the central server for supplemental analysis, current overrun span which defines number of historical seconds to detect a current overrun, no current count which defines the number of times a "no current" can be detected over a span before an alert is triggered, low current reading count which defines the number of allowed low reading values over a span of time before an alert is triggered, maximum data span which defines the number of sensor readings that the local processor will keep resident in memory for processing, check high low span which defines the number of historical cycles the systems uses to check high and low material levels from the level sensor, max fill time which defines the maximum time it takes to fill a container, and blink flag configuration which allows local processor board to "blink" and act as a physical indicator to assist on site technician in finding the processor board when maintenance is needed.

In an example of a monitoring system implementing automated operational parameter update functionality referenced above, a simple material system may only be using electrical current readings from the conveyance motor and still provide valuable data about the environment. For a simple motor "off" condition, the local processor and sensors may identify a motor off condition as the current reading being zero (0) as initially defined by the user when original operational parameters were uploaded to the central server. However, parasitic electrical draw may occur even when the motor is off causing the current sensor to return non-zero reading and thereby causing the local processor to incorrectly identify the motor as running. Accordingly, the motor off leakage threshold operational parameter referenced in the listing above can be retrieved from the central sever and subsequently allow the local processor to detect and factor out the parasitic current draw by re-base lining the current draw data back to zero (0). Accordingly, the monitoring system processes this potential change in the motor "off" condition so that motor off processing continues and the motor is reported as off in the environment report discussed above.

In such a case the parasitic electrical draw of a motor may be 0.15 amps. Once this current draw reading is processed within the local processor and relayed to the central server, an updated operational parameter from the central server can be relayed back to the local processor to re-base line the current reading back to zero (0) if the current is not above a certain amperage reading and subsequently establish a more accurate "on" and "off" state as the motor sensor continues to monitor the motor current. After establishing a more accurate "on" and "off" state, the system needs to understand what a normal timeframe for an "off" state is. Perhaps a typical "off" state is a maximum of 35 minutes. Knowing that a cloud based parameter can indicate a maximum time frame for an "off" state, anything beyond 35 minutes indicates an error condition. For the sake of this monitoring system and the use of a limited sensor set, an "off" state that exceeds a cloud threshold can indicate a disconnected or malfunctioning sensor, a broken electrical switch that controls the motor or a loss of power to the motor which is particularly useful in feeding environments to make sure animals are fed.

In operation, the operation parameters describe container volume and motor characteristics that allow the system to process the data from the sensors for reporting and to identify when alert condition thresholds have been met. Using the example above, operational parameters and corresponding alert condition thresholds include an "off" state threshold if the off condition of the motor exceeds configurable limits; an "on" state threshold if the "on" condition of the motor exceeds configurable limits which could indicate that the controlling switch is broken and the motor is continuously running or that lower limits of grain thresholds are being moved but forcing motors to run longer than desired; inductance load threshold wherein a motor turns "on" and there is a spike in the current readings to get the motor running wherein if the spike is too high or runs too long, as defined by the operational parameters, users are notified of this condition where it could be that the motor is burning out or that there is a blockage or bind in the system; check in parameter threshold where the central serve scans all recent transactions for missing check-in data from the local processing units wherein if a local processor did not check-in by sending the environment report within a configurable time, the central server will alert users that the system is not reporting and needs attention. Thus, a simple reading of current and automatic adjustment of the motor current operational parameter for parasitic draw provides a valuable indicator of the overall run time state of the motor, conveyance environment and various other alerts that can communicated back to the user.

Given the real-time information and environmental information within the system, mechanical devices can be automatically controlled by the system depending on operational parameters and optimized operation characteristics. For example, the system continuously monitors bulk material volume within the container based on the initial fill event and the calculated flow rates of the material as detailed above. Assuming there are materials remaining in the container, when the current sensor detects that the motor is running but amperage indicates that there is little to no drag on the motor and a Low Current Draw is identified, the system assumes that an alert condition has occurred and the material is top crusted and can subsequently activate an agitator controlled by an agitator motor within or outside of the container to cause the material in the container to shift and resettle, such as with the Flow Hammer illustrated in FIG. 2. As soon as the current sensor detects a sufficiently high amperage from the conveyance motor, the agitator is turned off. This allows for a hands-free environment that keeps material continually moving.

Further still, in addition to monitoring the system adjusting certain mechanical controls based on the measured environment conditions and optimal operational characteristics, the user can also manually control portions of the material system through their user account. In operation, the user uploads an instruction 86 to the central server through the user account and the instruction is subsequently relayed to the local processor. Once the instruction is received, the control module in the local processor can adjust the motor, the sensors, the container mechanisms and modify the operational parameters and alert variance thresholds. For example, the user can manually power an agitator motor on and off to facilitate better material distribution or breakup top crusted material. Thus, even though the system allows for automated control, users can also manually adjust certain mechanical devices within the environment.

In addition to setting and relaying alerts and carrying out the other functions described herein, the central server receives and stores measured data, such as startup data, check-in data, material container capacity and current draw received from the local sensors in the database. Thus, data collected from previous runs is saved as a historic dataset and allows the local processor to continually compare current environmental conditions, such as material level and motor current draw, with recorded historic sets of operational parameters from completed system-cycles and produce updated operational parameters based on the same. These updated operational parameters thereby allow the system to augment flow rate calculations and otherwise adjust system operations and thereby allow for improved predictive analysis, such as runtime and empty states.

For example, through "AI" functionality, telemetry from previous runs allows the processor to continually access the current fill state of a container using previously collected patterns from completed system-cycles. This processing occurs in both the local processor and central server where the local processor will calculate a new predicted date and time of empty for the container based upon usage trends. Since there can be a wide variation of when a full container can be emptied, the local processor will provide the central server with a current set of data. The central server will then correlate the information with a number of previous cycles that closely match the data that the local processor provided and send previous matching cycle data back to the local processor and allow the local processor to normalize that data and calculate a predicted runout.

The database also holds user defined configurations for the local sensors particularly suited for managing specific material container and motor environments. The local sensors pull configurations from the central on startup and continuously retrieve new configurations based new materials being identified in real-time as well as updated operation parameters that are periodically checked by the local sensors. The central server also stores user login information, application roles and sub-roles, feed system names, user settings such as alert types and frequency and historical data, such as container size, motor parameters and saved sensor readings from previous runs.

Although container volume monitoring and run out forecasting is the primary factor intended to be improved with the monitoring system described herein, it will be appreciated that historical data could also be used to look at seasonal issues especially with livestock, seeing that livestock will consume more or less depending on the outside temperature. Thus, the facility has better seasonal predictions which can be predicted based on historical data saved in the database. Also, the facility can use accurate run-out dates and times to determine when best to purchase more material. For instance, if a predicted run-out is the Monday after Thanksgiving, then you can use the days before Thanksgiving to purchase material and have it delivered that Monday morning. Or, perhaps run-out is on Saturday after Thanksgiving, you can do a partial fill to continue operations until full staff is on-site. Also, you can assess the efficiency of a supplier and staff by understanding when run-out occurs and when a fill event actually happened. Did staff order in time? Did staff order under emergency fill costing? Did the supplier promptly deliver on the projected run-out date?

When did the system report a fill event? With these historical datasets available in the central server database, users can not only monitor and control the environment in real-time but broadly optimize their environment's efficiencies based on historic trends that may become apparent as data is continuously collected and saved.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be understood that one could replace the preferred sonar level sensor with any type of device that can measure distance such as lidar, radar, laser or a mechanical measuring device. Further, the motor sensor could measure torque, speed, sound, or other attributes of the system instead of motor current and the cloud computations could be moved to another environment, such as a central server with the same wireless connection to the local processor or a wired connection. Thus, the breadth and scope of the present invention should not be limited by any of the above-described exemplary embodiments, but should be defined only in accordance with the following claims appended hereto and their equivalents.

What is claimed is:

1. A storage system for a bulk material with filling and dispensing monitors and controls, comprising:
    a container comprising an interior space and an outlet, and wherein the bulk material is filled to a level within the interior space of the container;
    a material level sensor positioned within the interior space of the container opposite from the outlet, wherein the material level sensor detects the fill level of the bulk material within the interior space of the container;
    a motor operatively engaged with the outlet of the container, wherein the motor dispenses the bulk material from the container through the outlet at a material flow rate correlated to an electrical current draw;
    a motor sensor connected to the motor, wherein the motor sensor monitors the electrical current draw of the motor;
    a central server located distally from the container and the motor, wherein the central server comprises a server processing module, a server communications module, and a database in a data storage module, wherein the database stores a set of operational parameters and set of alert conditions, wherein the set of operational parameters comprise a container volume corresponding to the interior space of the container, an electrical current range corresponding to operation of the motor, and a flow rate range corresponding to the electrical current range, and wherein the set of alert conditions comprise a variance threshold corresponding to the set of operational parameters;
    a local processor located proximally to the container and the motor, wherein the local processor comprises a local communications module, a local processing module and a control module, wherein the local communications module is in operative communication with the material level sensor, the motor sensor, the motor, the container, and the central server, wherein the local processor receives the fill level and the electrical current draw respectively from the material level sensor and the motor sensor, wherein the local processor receives the container volume and the flow rate range corresponding to the electrical current range from the central server, wherein the local processor correlates the fill level with the container volume and calculates an initial bulk material volume within the container, wherein the local processor integrates the electrical current draw with the flow rate range over a period of time and calculates the material flow rate, and wherein the local processor correlates the initial bulk material volume with the material flow rate and calculates an estimated bulk material volume within the container at a point in time during the period of time;
    a user account in operative communication with the central server, wherein the user account is accessed by a user on a user device;
    an environment report created by the local processing module in the local processor at the point in time, wherein the environment report comprises at least one of the fill level, the initial bulk material volume, the electrical current draw, the material flow rate, and the estimated bulk material volume, and wherein the environment report is relayed to the central server, saved in the database and accessed by the user through the user account; and
    an alert created by the local processing module in the local processor when at least one alert condition in the set of alert conditions is met, wherein at least one alert condition is met when at least one operational parameter is outside the variance threshold, and wherein the alert is relayed from the central server to the user through the user account.

2. The system of claim 1, wherein at least one of the central server and the local processor correlate the estimated bulk material volume with the material flow rate and calculate a container runout, and wherein the container runout is included in at least one of the alert and the environment report.

3. The system of claim 1, wherein the server processing module correlates the container volume with the flow rate range corresponding to the electrical current range and produces an expected bulk material volume within the container at the point in time during the period of time, wherein the expected bulk material volume is received in the local processor and correlated with the estimated bulk material volume by the local processing module, and wherein an alert condition in the set of alert conditions is met when the estimated bulk material volume and the expected bulk material volume are outside the variance threshold at the point in time during the period of time.

4. The system of claim 1, further comprising a database update uploaded to the central server through the user account, wherein the central server receives the database update and updates at least one of the set of operational parameters and the set of alert conditions stored in the database with an updated set of operational parameters and an updated set of alert conditions.

5. The system of claim 1, wherein the database further comprises a historic dataset based on a plurality of previous run-cycles corresponding to the environment, wherein the historic dataset comprises a set of historic operational parameters and a set of historic alert conditions, wherein the central server correlates the set of historic operational parameters with the fill level, the electrical current draw and the set of operational parameters and produces at least one of an updated set of operational parameters and an updated set of alert conditions, wherein the updated set of operational parameters and the updated set of alert conditions respectively replace the set of operational parameters and the set of alert conditions, and wherein the central server relays at least one the updated set of operational parameters and the updated set of alert conditions to the local processor.

6. The system of claim 1, wherein the container further comprises an agitator motor actuating an agitator engaged with the container, wherein the agitator motor is in operative communication with the local processor, wherein an alert condition in the set of alert conditions corresponds to the fill level, and wherein the local processor activates the agitator through the control module in response to the alert created when the alert condition corresponding to the fill level is met.

7. The system of claim 6 further comprising an instruction uploaded to the central server through the user account, wherein the central server relays the instruction to the local processor, and wherein the local processor adjusts the material sensor, the motor sensor, the motor and the agitator motor through the control module in response to the instruction.

8. The system of claim 1 further comprising another sensor, wherein at least one of the other sensor, the material level sensor and the motor sensor detect a plurality of environmental conditions, wherein the plurality of environmental conditions correspond to at least one of an ambient atmosphere within the interior space of the container, an operation metric of the motor, and a state of the bulk material, wherein the ambient atmosphere comprises the container volume, wherein the operation metric comprises the electrical current range, and wherein the set of operational parameters correspond to the plurality of environmental conditions.

9. The system of claim 8, wherein the other sensor is comprised of a material sensor positioned within the interior space of the container and in operative communication with the local processor, wherein the material state comprises a material type, wherein the material sensor identifies the material type and relays the material type to the local processor, wherein the local processor relays the material type to the central server, wherein the central server correlates the material type with the set of operational parameters and produces at least one of an updated set of operational parameters and an updated set of alert conditions, wherein the updated set of operational parameters and the updated set of alert conditions respectively replace the set of operational parameters and the set of alert conditions, and wherein the central server relays at least one the updated set of operational conditions and the updated set of alert conditions to the local processor.

10. The system of claim 8, wherein the other sensor is comprised of a humidity sensor positioned within the interior space of the container and in operative communication with the local processor, wherein the ambient atmosphere comprises a container humidity level, wherein the material state comprises a material humidity level, wherein the humidity sensor detects at least one of the container humidity level and the material humidity level and relays at least one of the container humidity level and the material humidity level to the local processor, wherein the local processor relays at least one of the container humidity level and the material humidity level to the central server, wherein the central server correlates at least one of the container humidity level and the material humidity level with the set of operational parameters and produces at least one of an updated set of operational parameters and an updated set of alert conditions, wherein the updated set of operational parameters and the updated set of alert conditions respectively replace the set of operational parameters and the set of alert conditions, and wherein the central server relays at least one the updated set of operational parameters and the updated set of alert conditions to the local processor.

11. The system of claim 1, wherein an alert condition in the set of alert conditions comprises a user established condition, wherein the user established condition comprises a container volume percentage, wherein the alert condition is met when the container volume percentage is below the user established condition, and wherein another condition in the set of alert conditions is selected from the group consisting of a scheduled bulk material level volume alert, a warning bulk material volume level alert, a low bulk material volume level alert, an invalid sensor reading alert, a motor stoppage alert, a sensor loss alert, a motor run length alert, a motor amperage alert, a material maximum alert, a material minimum alert, a run time error alert, a container control activation alert, a container control deactivation alert, a loss of signal alert, a system reboot alert, a fill event alert, and a network loss alert.

12. A storage system for a bulk material with filling and dispensing monitors and controls, comprising:
    a container comprising an interior space and an outlet, wherein the bulk material is filled to a level within the interior space of the container, and wherein the interior space comprises an ambient atmosphere;
    a motor operatively engaged with the outlet of the container, wherein the motor dispenses the bulk material from the container through the outlet at a material flow rate correlated to an operation metric of the motor;
    a sensor set operatively connected to the container and the motor, wherein the sensor set detects a plurality of environmental conditions, and wherein the plurality of environmental conditions correspond to at least one of the ambient atmosphere within the container, the operation metric of the motor and a state of the bulk material;
    at least one of a central server located distally from the container and the motor and a local processor located proximally to the container and the motor, wherein at least one of the central server and local processor respectively store a set of operational parameters and a set of alert conditions in a database, wherein the set of operational parameters correspond to the plurality of environmental conditions, wherein the set of alert conditions comprise a variance threshold corresponding to the set of operational parameters, wherein at least one of the central server and the local processor receives the plurality of environmental conditions from the sensor set, and wherein the local processor correlates the plurality of environmental conditions with the set of operational parameters and the set of alert conditions;
    a user account in operative communication with at least one of the central server and the local processor, and wherein the user account is accessed by a user on a user device;
    an environment report created when the plurality of environmental conditions correlated with the set of operational parameters and the set of alert conditions in the local processor are within the variance threshold, and wherein the environment report is stored in at least one of the to the central server and the local processor and accessed by the user through the user account; and
    an alert created when the plurality of environmental conditions correlated with the set of operational parameters and the set of alert conditions in the local processor are outside the variance threshold, and wherein the alert is relayed to the user through the user account by at least one of the central server and the local processor.

13. The system of claim 12, wherein the sensor set further comprises a material level sensor and a motor sensor, wherein the material level sensor is positioned within the interior space of the container and detects the fill level of the bulk material within the interior space of the container, and wherein the motor sensor is connected to the motor and detects the electrical current draw of the motor.

14. The system of claim 13, wherein the set of operational parameters comprise a container volume corresponding to the interior space of the container, an electrical current range corresponding to the motor, and a flow rate range corresponding to the electrical current range, wherein at least one of the central server and the local processor correlate the fill level with the container volume and calculate an initial bulk material volume within the container, wherein at least one of the central server and the local processor integrate the electrical current draw with the flow rate range over a period of time and calculate the material flow rate, wherein at least one of the central server and the local processor correlate the initial bulk material volume with the material flow rate and calculate an estimated bulk material volume within the container at a point in time during the period of time, wherein at least one of the central server and the local processor correlate the estimated bulk material volume with the material flow rate and calculate a container runout, and wherein the container runout is included in at least one of the alert and the environment report.

15. The system of claim 12, wherein the sensor set further comprises a material sensor and a humidity sensor, wherein the material sensor identifies a material type corresponding to the state of the bulk material, wherein the humidity sensor identifies a humidity level corresponding to at least one of the ambient atmosphere of the container and the state of the bulk material, wherein the material sensor and the humidity sensor relay the material type and the humidity level to at least one of the central server and the local processor, wherein at least one of the central server and the local processor correlates the material type and the humidity level with the set of operational parameters and produces an updated set of operational parameters, and wherein the updated set of operational parameters replace the set of operation parameters.

16. A method for monitoring and controlling a bulk material bulk material storage environment having a container and a motor, comprising the steps of:
providing a sensor set for the container and the motor;
detecting a plurality of environmental conditions via the sensors, wherein the plurality of environmental conditions correspond to at least one of an ambient atmosphere within the container, an operational metric of the motor and a state of the bulk material;
providing a local processor in operative communication with the sensor set, the container and the motor;
providing a central server in operative communication with the local processor, wherein the central server comprises a database storing a set of operational parameters and set of alert conditions, wherein the set of operational parameters correspond to the plurality of environmental conditions, and wherein the set of alert conditions comprise a variance threshold corresponding to the set of operational parameters;
receiving in the local processor the plurality of environmental conditions, the set of operational parameters, and the set of alert conditions;
correlating the plurality of environmental conditions with the set of operational parameters and the set of alert conditions;
determining a system state in the local processor based on the correlated plurality of environmental conditions, set of operational parameters and set of alert conditions;
producing a system report when the plurality of environmental conditions correlated with the set of operational parameters and the set of alert conditions in the local processor are within the variance threshold;
producing a system alert when at least one condition in the plurality of environmental conditions correlated with the set of operational parameters and the set of alert conditions in the local processor is outside the variance threshold; and
relaying the system alert and the system report to the central server.

17. The method of claim 16, further comprising the steps of:
providing a user account in operative communication with the central server;
relaying the system alert from the central server to the user account; and
updating at least one of the set of operational parameters and the set of alert conditions according an instruction entered into the user control device based on the system alert.

18. The method of claim 16 further comprising the step of normalizing a condition in the plurality of environmental conditions when at least one condition in the plurality of environmental conditions correlated with the set of operational parameters and the set of alert conditions in the local processor is outside the variance threshold.

19. The method of claim 16 further comprising the steps of:
accessing a historic dataset saved in the database based on a plurality of previous run-cycles corresponding to the environment;
correlating the historic dataset with the system state; and
updating at least one of the set of operational parameters and the set of alert conditions based on the correlated historic dataset and the system state.

20. The method claim 16, wherein the sensor set comprises a level sensor and a motor sensor, wherein the level sensor is positioned within an interior space of the container and detects an initial level of the bulk material within the interior space of the container, wherein the motor sensor is connected to the motor and detects an electrical current draw of the motor, wherein the local processor correlates the electrical current draw of the motor with a range of flow rates saved in the database to produce an estimated material flow rate, and wherein the local processor calculates an estimated material volume at a point in time based on the estimated material flow rate and the initial level.

* * * * *